United States Patent [19]

Alvarez

[11] 4,058,886

[45] Nov. 22, 1977

[54] BATTERY CASE SALVAGE MACHINE

[76] Inventor: Oscar E. Alvarez, 5700 Mariner South, Apt. 701 E., Tampa, Fla. 33609

[21] Appl. No.: 648,047

[22] Filed: Jan. 12, 1976

Related U.S. Application Data

[63] Continuation-in-part of Ser. No. 551,523, Feb. 21, 1975, abandoned.

[51] Int. Cl.$^2$ .......................... H01M 6/52; B23Q 7/00
[52] U.S. Cl. ......................................... 29/563; 429/49; 29/763
[58] Field of Search .................. 136/174, 176; 429/49; 29/730, 763, 401 R, 401 E, 403, 33 P, 563 R

[56] References Cited

U.S. PATENT DOCUMENTS

| | | | |
|---|---|---|---|
| 2,250,490 | 7/1941 | Larmor | 136/174 |
| 2,398,275 | 4/1946 | Alpert | 136/174 |
| 3,544,754 | 12/1970 | Buttke et al. | 136/176 |

Primary Examiner—Donald L. Walton

Attorney, Agent, or Firm—Arthur W. Fisher, III

[57] ABSTRACT

A battery casing salvage machine comprising a plurality of discrete stations disposed in operative communication by a conveyor means to sequentially remove the original cover from the enclosed battery case and rebuild the battery case and battery cell partitions. The plurality of discrete stations includes a first station comprising a first cutting means including a saw cutting means to remove at least a portion of the original battery cover and the upper portion of the original battery case, a second station comprising a second cutting means including a bevel cutting means to remove the remaining portion of the original battery cover, and a third station comprising a third cutting means including at least one drill means to undercut the battery cell partitions where the cell connectors are fused together. The battery casing salvage machine further includes an automatic feed means disposed in operative relationship to the first station to continuously feed battery casings thereto.

19 Claims, 7 Drawing Figures

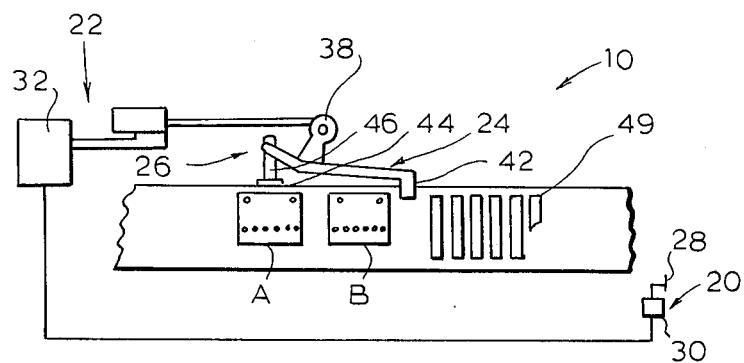
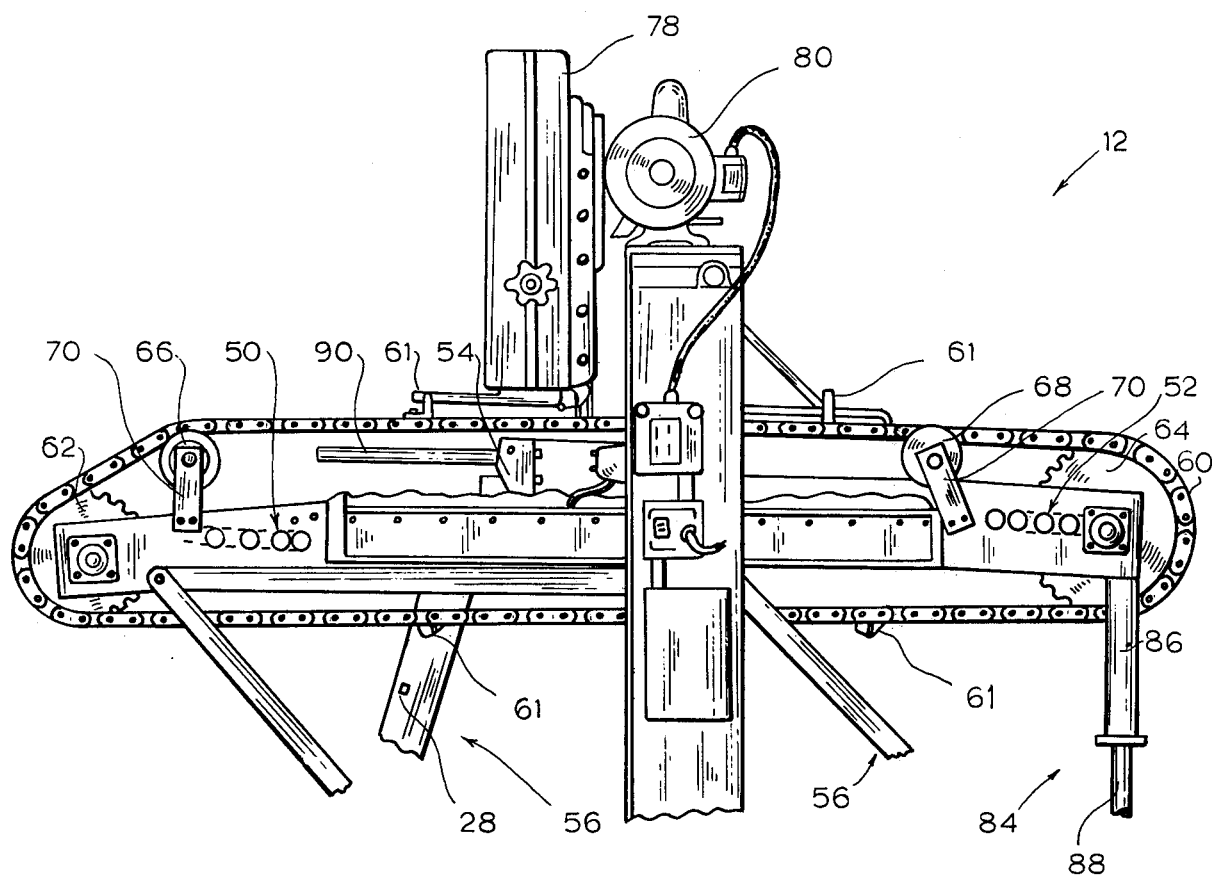

BATTERY CASE SALVAGE MACHINE

This is a continuation-in-part application of my co-pending application Ser. No. 551,523 filed Feb. 21, 1975 now abandoned.

BACKGROUND OF THE INVENTION

1. Field of the Invention

A battery casing salvage machine comprising a plurality of integrated stations disposed in operative communications by a conveyor means to sequentially remove the original battery cover from the enclosed battery case and rebuild the battery case and battery cell partitions.

2. Description of the Prior Art

Annually an incalcuable number of storage batteries, no longer useful, are discarded. Generally such disposition results in the disposal of still usable battery casings and recoverable lead products. To recover the lead and salvage the battery casing it is necessary to dispose of the sulfuric acid and to separate the lead cell grids, and the settled lead in the bottom of the battery casing. To accomplish this it is necessary to provide an apparatus by which the acid and lead constituents are easily dislodged from the battery casing and recovered apart from the battery casing while at the same time preserving the battery casing.

There are a number of devices which provide vibrating or shaking apparatus by which the battery casing is vigorously shaken in an inverted position until the contents thereof are dislodged. Unfortunately these devices do not accommodate the preservation of the battery casing.

Thus there still remains a need for an efficient means of recovering the constituents and at the same time not damage the battery casing.

SUMMARY OF THE INVENTION

The present invention relates to a battery casing salvage machine. More specifically, the battery casing salvage machine comprises an automatic feed means a first station a second station and a third station. The automatic feed means, first station, second station and third station are coupled in operative communication by an interrupted conveyor means. Each of the components are mounted on support frame.

The automatic feed means comprises a control means, actuator means, stop means and lock means. The control means includes a switch means disposed to selectively engage the first station and a solenoid coil coupled between the switch means and the actuator means. The stop means comprises stop member coupled to the actuator means and disposed to selectively engage the battery casings. As described more fully hereinafter, the lock means comprises a plunger element coupled to the actuator means and disposed to selectively engage the battery casings as more fully described hereinafter.

The first station comprises a first battery support means mounted on a battery support means frame and a battery movement means. The battery movement means includes a plurality of battery engaging elements disposed to engage the switch means and the battery casings. The plurality of battery engaging elements is coupled to a first drive means to move the battery casings through the first station. The first station further includes a first cutting means including a substantially horizontal endless band saw coupled to a second drive means. An adjustment means is attached to the battery support means frame to permit adjustment of the battery support means frame relative to the horizontal endless band saw.

The second station comprises a second battery support means and a second cutting means. The second cutting means comprises a cutting element movably mounted on a substantially horizontal element to permit longitudinal movement perpendicular to the longitudinal axis of the second battery support means. The cutting head includes cutting disk, bevel guage and alignment means. The cutting disk is operatively coupled to a third drive means and the bevel guage and alignment means to control the cutting plane of the cutting disk relative to the battery casing.

The third station comprises a third battery support means adjustably mounted on the support frame and a third cutting means. The third battery support means is adjustable longitudinally and laterally relative to the third cutting means by an adjustment means. The third cutting means comprises a pair of substantially vertical spindles having first and second drill means respectively attached to the lower portions thereof. The first and second drill means are operatively coupled to a fourth drive means. The spindles are movable between an upper and lower limit.

In operation, the outside of battery casings are cleaned with a pressure spray and the battery caps are removed. The acid is then drained from the battery casings.

The automatic feed means feeds the battery casings to the first station one at a time. The battery engaging elements selectively engage the switch means to provide the proper operation timing of the automatic feed means. As the switch means is actuated by the battery engaging element, it energizes the solenoid coil. The energized solenoid coil moves the actuator means to the actuated position. As a result, the actuator means moves the stop means to the release position to release the first battery casing to the first station. Simultaneously, the plunger element moves to the lock position to hold the second battery casing until the stop means 24 returns to the stop position. The plunger element is then returned to the unlock position to release the second battery casing to the stop means.

As the battery casings enter the first station 12, the battery engaging elements pull the battery casings through the endless band saw. This cuts approximately ½ an inch from the top cover leaving the top of the battery casing completely exposed. The adjustment means permits movement of the battery support element relative to the endless band saw to accommodate battery casings of different heights.

The battery casing is then fed to the second station by gravity on the interrupted conveyor means 18. The battery casing enters the second station and stops on the second battery support means. Here the top outside edge of the battery casing is trimmed and the bevel on the upper outside edge of the battery casing is deepened. This is accomplished by moving the cutting element and cutting disk perpendicular to the longitudinal axis of the second battery support means at the proper height to trim the edge of the battery casing. The angle of cut is adjusted by rotation of alignment means with the beveled guage indicating the cut angle. When an edge of the battery casing is cut to depth and beveled, the battery casing is rotated 90 to the next side and the process is continued until all four sides are deepened and beveled. The new cover will now fit the battery casing. The cells are then removed from the battery casing and the inside is washed to remove all sediment in the bottom of the case casing.

The battery casing is then fed to the third station by gravity on the interrupted conveyor means. The battery casing enters the third station and stops on the third battery support means. Here, the cell partitions are recut where the cell connectors coupled and fused. The third battery support means is adjusted longitudinally and laterally relative to the third cutting means to position the cell partitions for cutting. The lower lent are then set to control the depth and width of the undercut. The first drill means is then removed downward to engage the cell partition to form an undercut. This process is continued until all the partitions are undercut to fit the cell connectors. The second drill means is operated similarly to cut a V-cut on the center partition of the case to match the bridge in the center sealing channel of the cover. This assures that the positive post will be in the correct position to match the cover.

Once the battery casing is reworked, the battery casing is ready to receive new cells and cover to complete the rebuilding.

It is thus apparent that this combination of elements provides an effective and efficient battery casing salvage machine.

The invention accordingly comprises the features of construction, combination of elements and arrangements of parts which will be exemplified in the construction hereinafter set forth, and the scope of the invention will be indicated in the claims.

BRIEF DESCRIPTION OF THE DRAWINGS

For a fuller understanding of the nature and the objects of the invention, reference should be had to the following detailed description taken in conjunction with the accompanying drawings in which:

FIG. 2 shows a detailed top view of an automatic feed means.

FIG. 3 shows a detailed view of a first station.

Similar reference characters refer to similar parts throughout the several views of the drawings.

DETAILED DESCRIPTION OF THE PREFERRED EMBODIMENT

Figure 1:
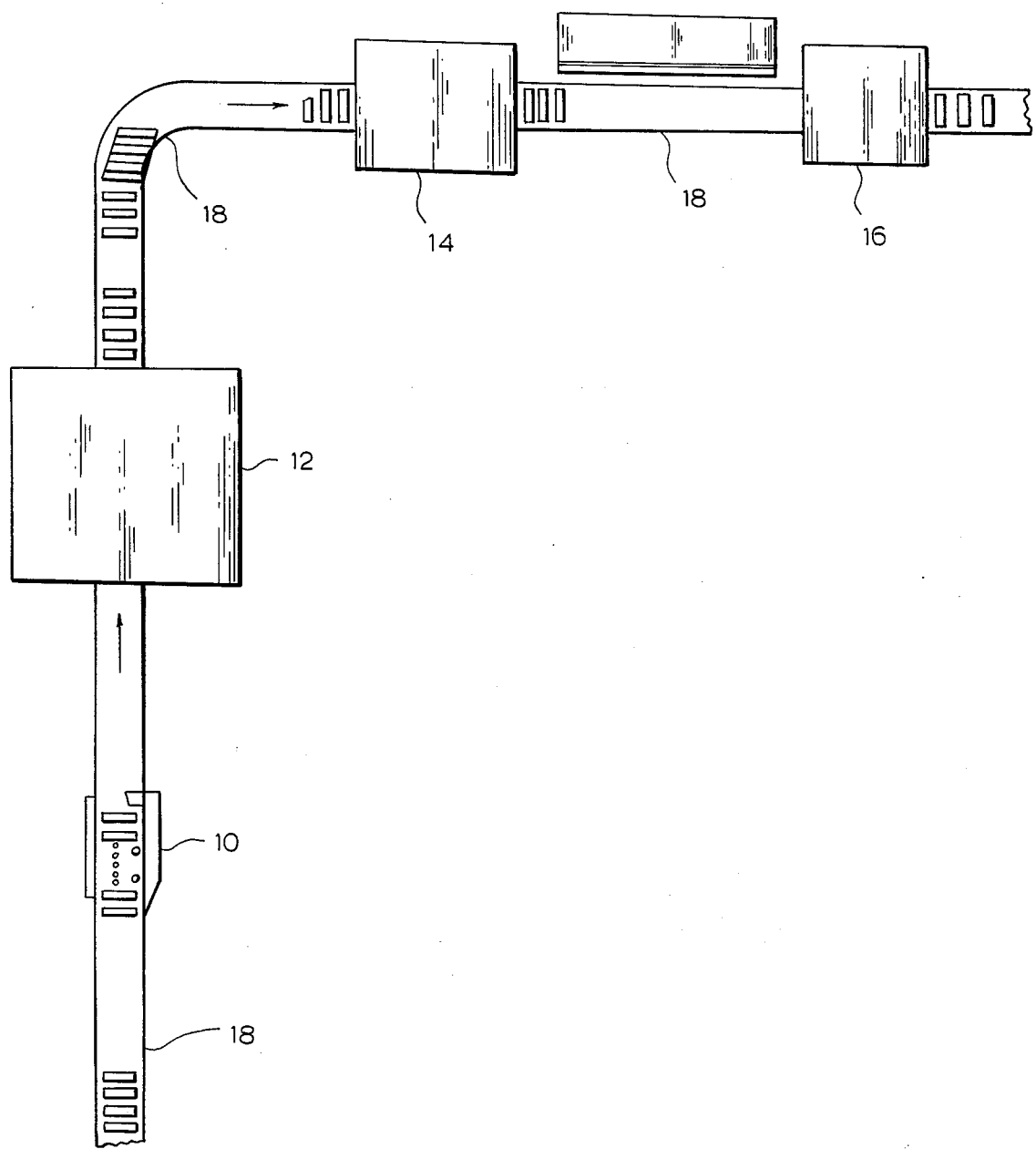
FIG. 1 shows a block diagram of a battery casing salvage machine.

FIG. 1 shows a block diagram of a battery casing salvage machine comprising an automatic feed means 10, a first station 12, a second station 14 and a third station 16. The automatic feed means 10, first station 12, second station 14 and third station 16 are coupled in operative communication by an interrupted conveyor means 18 as more fully described hereinafter. As described hereinafter, each of the components is mounted on support frame 19.

As best shown in FIG. 2, the automatic feed means 10 comprises a control means 20, actuator means 22, stop means 24 and lock means 26. The control means 20 includes a switch means 28 disposed to selectively engage the first station 12 as more fully described hereinafter and a solenoid coil 30 coupled between the switch means 28 and the actuator means 22. The actuator means 22 includes a pressurized air supply source 32 with an air cylinder 34 and piston 36 coupled thereto. The piston 36 is coupled to rocker arm 38 by interconnecting means or shaft 40. The stop means 24 comprises substantially L-shaped stop member 42 coupled to rocker arm 38 disposed to selectively engage battery casing A as described more fully hereinafter. The lock means 26 comprises lock member 44 including plunger element 46 disposed to engage battery casing B as more fully described hereinafter. The plunger element 46 is coupled to rocker arm 38 by plunger shaft 48. The battery casing A and B are supported by roller means 49 disposed diagonally to gravity feed the battery casings to the stop means 24 and lock means 26.

Figure 4:
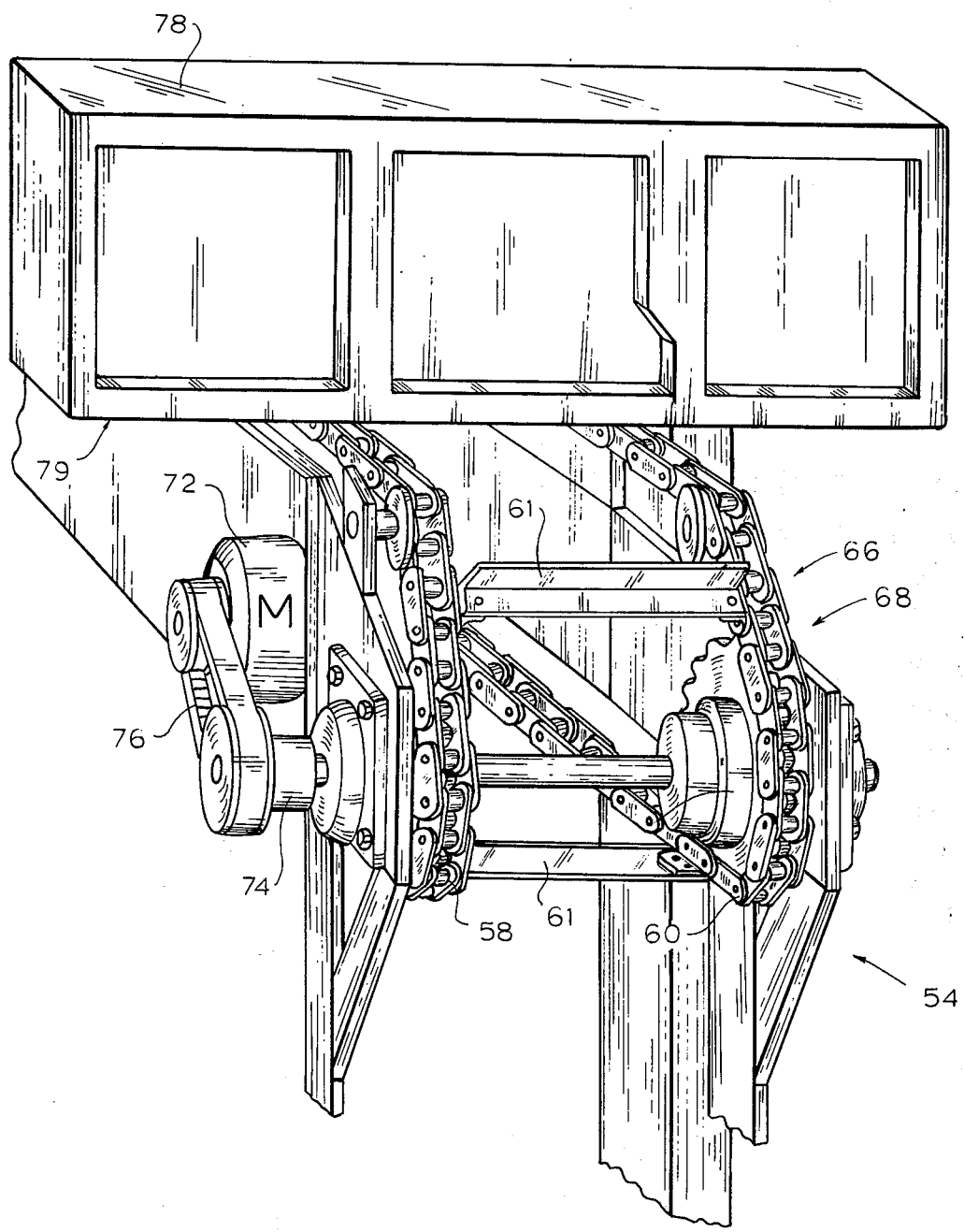
FIG. 4 shows a detailed end view of the first station.

As best shown in FIGS. 3 and 4, the first station 12 comprises a first battery support means including roller means 50 and 52 interrupted by substantially horizontal support element 54 mounted on battery support means frame 56 and a battery movement means including substantially parallel endless chains 58 and 60 mounted on a pair of drive sprockets 62 and a pair of idler sprockets 64 rotatably mounted on battery support means frame 56. Coupled across the parallel endless chains 58 and 60 is a plurality of battery engaging elements 61 disposed to engage the switch means 28 and battery casings A and B. The battery movement means further includes a first and second guide means 66 and 68, each comprising a pair of substantially parallel rollers rotatably mounted on the battery support means frame 56 by interconnecting support elements 70. Also included in the battery movement means is a first drive means 72 coupled to drive clutch 74 movable between a first and second position by endless drive chain 76. The first station 12 further includes a first cutting means generally indicated as 78. The first cutting means 78 includes a substantially horizontal endless band saw 79 coupled to a second drive means 80. The battery support means frame 56 is pivotally mounted on the support frame 19 by shaft 82 to permit vertical adjustment of the battery support means generally indicated as 84. The adjustment means 84 comprises an upper yoke 86 attached to the battery support means frame 56 and a lower adjustment member 88 coupled in telescoping relation thereto. A battery guide means 90 is mounted on frame 56 to securely hold the battery during cutting.

Figure 5:
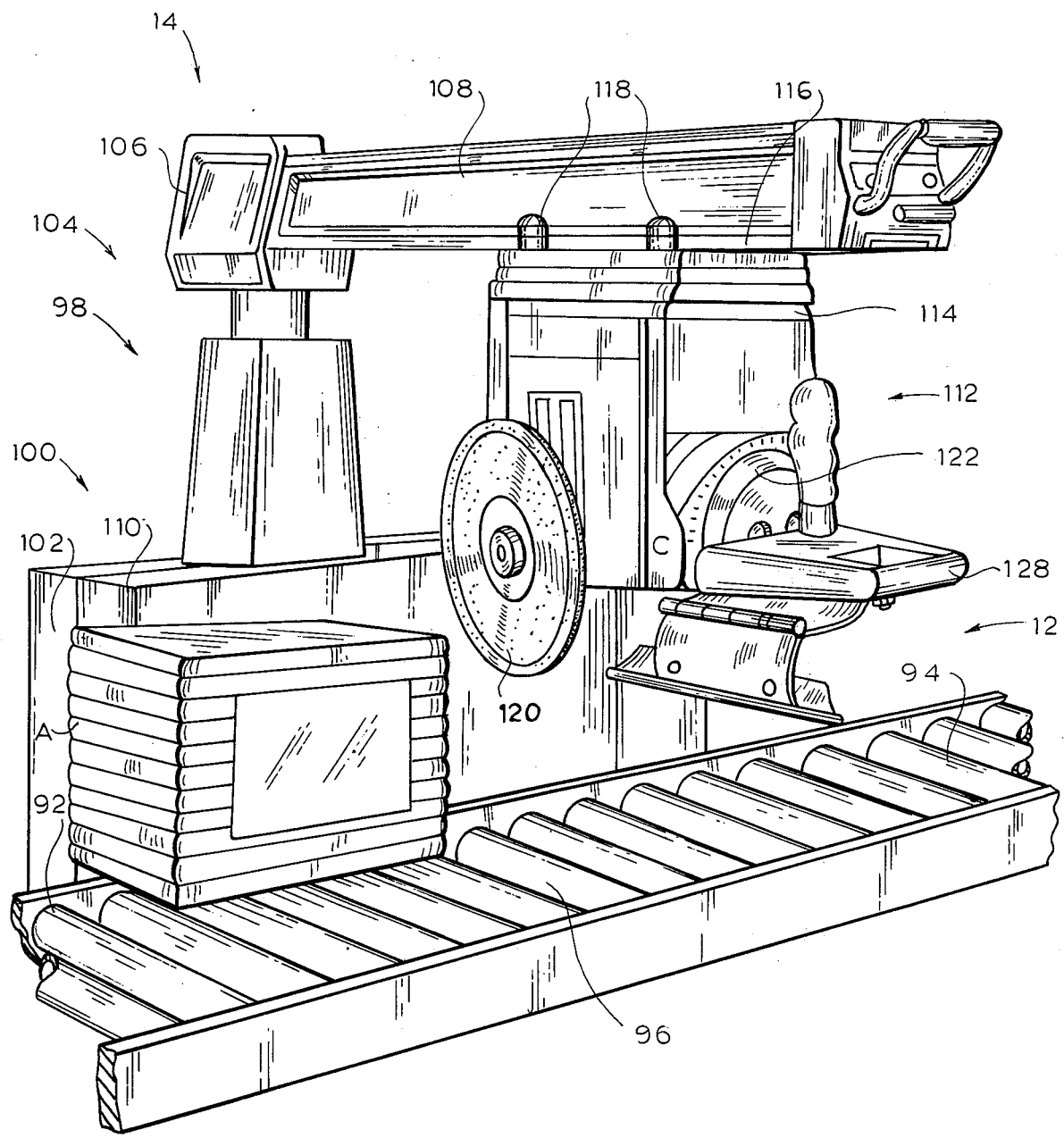
FIG. 5 is a detailed perspective view of a second station.

As best shown in FIG. 5, the second station 14 comprises a second battery support means including roller means 92 and 94 interrupted by substantially horizontal support element 96 mounted on support frame 19 and a second cutting means generally indicated as 98. The second cutting means 98 comprises a substantially vertical base 100 including a fixed lower member 102 having an adjustable upper member 104 attached in telescoping relation thereto. The adustable upper member 104 includes a substantially vertical element 106 and a substantially horizontal element 108 extending outwardly therefrom. A back plate 110 is attached to fixed lower member 102. A cutting element 112 is movably mounted on substantially horizontal element 108 to permit longitudinal movement perpendicular to the longitudinal axis of the second battery support means. The cutting element 112 includes movable head 114 attached to substantially parallel rails 116 formed on opposite sides of the horizontal element 108 by rollers 118, cutting disk 120, bevel guage 122, alignment means 124 and handle 126. The cutting disk 120 is operatively coupled to a third drive means (not shown). The cutting disk 120 is also coupled to the bevel guage 122 and alignment means 124 to control the cutting plane of the cutting disk 120 relative to the battery casing A. The substantially horizontal support element 108 may be rotatably mounted to provide automatic operation as described more fully hereinafter.

Figure 6:
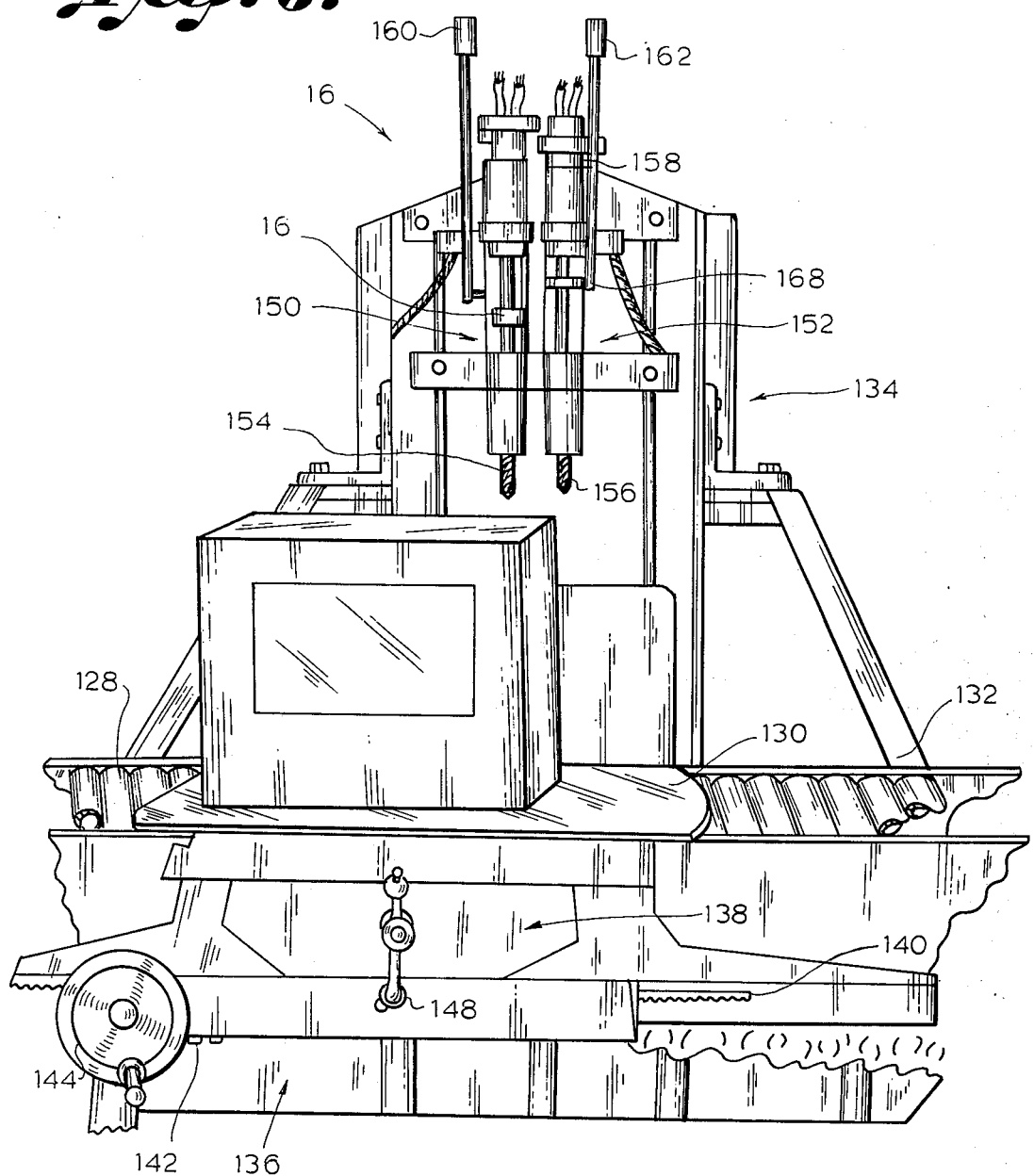
FIG. 6 is a detailed side view of a third station.

As best shown in FIG. 6, the third station 16 comprises a third battery support means including roller means 128 and 130 interrupted by substantially horizontal support element 132 adjustably mounted on support frame 19 and a third cutting means generally indicated as 134. The substantially horizontal support element 132 is adjustable longitudinally and laterally relative to the third cutting means 134 by an adjustment means including first and second adjustment elements 136 and 138 respectively. The first adjustment element 138 comprises a rack and pinion combination 140 and 142 operated by rotatable control handle 144. The second adjustment element 138 comprises a worm gear combination operated by rotatable control handle 148. The third cutting means 134 comprises a pair of substantially vertical spindles 150 and 152. having first and second drill means 154 and 156 respectively attached to the lower portions thereof. The first and second drill means 154 and 156 are operatively coupled to a fourth drive means 158. The spindles 150 and 152 are movable between an upper and lower limit by handle means 160 and 162 respectively.

In operation, the outside of battery casings are cleaned with a pressure spray and the battery caps are removed. The acid is then drained from the battery casings before being placed on support roller means 49.

The automatic feed means 10 feeds the battery casings to the first station 12 one at a time. The battery engaging elements 61 selectively engage the switch means 28 to provide the proper operation timing of the automatic feed means 10. As the switch means 28 is actuated by the battery engaging element 61, it energizes the solenoid coil 30. The energized solenoid coil 30 moves the actuator means 22 to the actuated position. As a result, the piston 36 moves the stop means 24 to the release position to release the first battery casing A on the support means 49 which then enters the first station 12. Simultaneously, the plunger element 46 moves to the lock position to hold the second battery casing B on the support means 49 until air is released from the piston 36 and the stop means 24 returns to the stop position. The plunger element 46 is then returned to the unlock position to release the second battery casing B to the stop means 24.

As the battery casings enter the first station 12, the battery engaging elements 61 spaced every 25 inches push the battery casings through the endless band saw 79. This cuts approximately ⅛ an inch from the top cover leaving the top of the battery casing completed exposed. If the battery casings are cut on a roller, there is a tendency to jam the first station 12. In addition, when on a roller there is a tendency to feed in an irregular manner. When either occurs there are rough cut edges on the battery casings. Therefore, the battery casings must be cut on the horizontal support element 54. Further, it may be noted that the endless band saw 79 be at least ¾ of an inch in width to give a smooth cut on top edge of battery casing. This is important to insure a proper fit to new cover. Elements 61 are disposed angularly to the endless chain 58 and 60 to cut the casings at an angle.

The drive clutch 74 is provided to release the tension on the endless drive chain 76 in the event of a jam.

The adjustment means 84 permits movement of the battery support element 54 relative to the endless band saw 79 to accommodate battery casings of different heights. This is accomplished by moving the lower adjustment member 88 relative to the upper yoke or upper adjustment member 86 to pivot the battery support means 56 about shaft 82.

Figure 7:
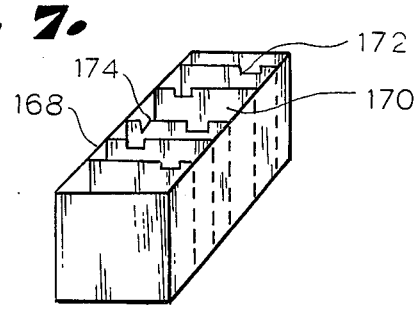
FIG. 7 is a prospective view of a battery casing.

The battery casing is then fed to the second station 14 by gravity on the interrupted conveyor means 18. The battery casing enters the second station 14 on the roller means 92 and stops on the horizontal support element 96. Here the top outside edge of the battery casing is trimmed and the bevel on the upper outside edge of the battery casing is deepened 168 of FIG. 7. This is accomplished by moving the movable head 114 and cutting disk 120 perpendicular to the longitudinal axis of the second battery support means at the proper height to trim the edge of the battery. The angle of cut is adjusted by rotation of alignment means 124 with the bevel guage 122 indicating the cut angle. When one edge of the battery casing is cut to depth and beveled, the battery casing is rotated 90 to the next side and the process is continued until all four sides are deepened and beveled. The new cover will now fit the battery casing. The cells are then removed from the battery casing and the inside is washed to remove all sediment in the bottom of the case casing.

The battery casing is then fed to the third station 16 by gravity on the interrupted conveyor means 18. The battery casing enters the third station 16 on the roller means 128 and stops on the horizontal support element 132. Here, the cell partitions are recut where the cell connectors coupled and fused. The horizontal support element 132 is adjusted longitudinally and laterally relative to the third cutting means 136 by the control handles 144 and 148 to position the cell partitions 170 of FIG. 7 for cutting. The lower stop guages 164 and 166 are then set to control the depth and width of the undercut. The first drill means 154 is then moved downward by handle means 160 to engage the cell partition 170 to form undercut 172. This process is continued until all the partitions 170 are undercut 172 to fit the cell connectors. The second drill means 156 is operated similarly to cut a V-cut 174 on the center partition 170 of the case to match the bridge in the center sealing channel of the cover. This assures that the positive post will be in the correct position to match the cover.

Once the battery casing is reworked, the battery casing is ready to receive new cells and cover to complete the rebuilding.

It will thus be seen that the objects set forth above, among those made apparent from the preceding description, are efficiently attained, and, since certain changes may be made in the above construction without departing from the scope of the invention, it is intended that all matter contained in the above description, or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described,

What is claimed is:

1. A battery casing salvage machine comprising a conveyor means mounted on a support frame, a first and second station mounted on said support frame, and an automatic feed means mounted on said support frame, said conveyor means disposed relative to said automatic feed means to receive battery casings therefrom at predetermined intervals, said first station arranged in operative communication with said conveyor means to receive battery casings therefrom at predetermined intervals, said first station comprising a first battery support means, a first cutting means arranged above said first battery support means and a battery movement means movably mounted on said support frame, said battery movement means disposed relative to said conveyor means to engage the battery casing thereon and move the battery casing on said first battery support means through said first cutting means to cut at least a portion of the battery casing from the remainder thereof, said second station arranged in operative communication with said conveyor means to receive battery casings therefrom at predetermined intervals from said first station, said second station comprising a second battery support means and a second cutting means arranged above said second battery support means, said second cutting means including a cutting element movably mounted on said second station to permit movement thereof perpendicular to the axis of said second battery support means, said cutting element disposed to engage battery casings on said second battery support means.

2. The battery casing salvage machine of claim 1 wherein said first battery support means comprises an interrupted roller means arranged on opposite ends of a substantially horizontal support element.

3. The battery casing salvage machine of claim 2 wherein said battery movement means comprises a pair of substantially parallel endless chains mounted on a pair of drive sprockets having a plurality of battery engaging elements extending between said substantially parallel endless chains, said drive sprockets being coupled to a first drive means.

4. The battery casing salvage machine of claim 3 wherein said battery movement means further includes a drive clutch coupled to said pair of drive sprockets, said drive clutch operatively coupled to said first drive means by an endless drive chain.

5. The battery casing salvage machine of claim 3 wherein said battery movement means further includes a pair of idler sprockets and a first and second guide means to operatively support said pair of substantially parallel endless chains.

6. The battery casing salvage machine of claim 3 wherein each said battery engaging element comprises a cross-bar, said cross-bar being disposed angularly relative to said substantially parallel endless chains.

7. The battery casing salvage machine of claim 6 wherein said first station further includes a battery guide means disposed to engage battery casings on said first battery support means to secure the battery casings during cutting.

8. The battery casing salvage machine of claim 1 wherein said first cutting means comprises a substantially horizontal endless band saw coupled to a second drive means.

9. The battery salvage machine of claim 1 wherein said first battery support means is pivotally mounted on said support frame and said first station further includes an adjustment means attached to said first battery support means, said adjustment means movable to control the position of said first battery support means relative to said first cutting means.

10. The battery casing salvage machine of claim 9 wherein said adjustment means comprises an upper yoke attached to said first battery support means and a lower adjustment member extending downwardly therefrom in telescoping relation thereto.

11. The battery casing salvage machine of claim 1 wherein said automatic feed means comprises a stop means movable between a first and second position to selectively release battery casings to said conveyor means, an actuator means movable between a first and second position, said actuator means coupled to said stop means to move said stop means between said first and second position, and a control means having a first and second state coupled between said first station and said actuator means, said control means generating a control signal when in said second state to move said actuator means to said second state to release a battery casing from said automatic feed means to said conveyor means.

12. The battery casing salvage machine of claim 11 wherein said control means comprises a switch means disposed to selectively engage said first station, said switch means having a first and second position, said control means generating said control signal when said switch is in said second position when engaged by said first station.

13. The battery casing salvage machine of claim 12 wherein said actuator means comprises an air cylinder having a piston movably between a first and second position disposed therein said air cylinder being operative coupled to a pressurized air supply source, said switch means being coupled to said pressurized air supply source to move said piston from said first to said second position when said switch means is in said second position to move said stop means to said second position.

14. The battery casing salvage machine of claim 13 wherein said automatic feed means further includes a lock means movable between a first and second position to selectively lock battery casings on said automatic feed means, said actuator means coupled to said lock means to move said lock means between said first and second position, said control means being coupled to said lock means to move said lock means from said first position to said second position when said control means generates said control signal to move said lock means to said second position.

15. The battery casing salvage machine of claim 13 wherein said stop comprises a substantially L-shaped member operatively coupled to said piston.

16. The battery casing salvage machine of claim 1 wherein said cutting element includes a movable head and a cutting disk operatively coupled to a third drive means, said cutting disk disposed to bevel the upper portion of the battery casing on said second battery support means.

17. The battery casing salvage machine of claim 16 wherein said second station further includes a bevel guage and alignment means operatively coupled to said cutting disk to control the cutting plane of said cutting disk relative to the battery casings.

18. The battery casing salvage machine of claim 1 further including a third station mounted on said support frame, said third station arranged in operative communication with said conveyor means to receive battery casings therefrom at predetermined intervals from said second station, said third station comprising a third battery support means and a third cutting means arranged above said third battery support means, said third cutting means comprising at least one drill means operatively coupled to a fourth drive means and a lower stop guage, said drill means disposed to selectively engage the battery casing on said third battery support means, said drill means movable between an upper and lower limit, said lower stop guage disposed to engage said drill means at said lower limit to control the depth of the cut on the battery casings.

19. The battery casing salvage machine of claim 18 wherein said third station further includes an adjustment means including a first and second adjustment element to adjust said third battery support means longitudinally and laterally relative to said third cutting means.